No. 621,314.  
W. E. BARBER.  
APPARATUS FOR MAKING RACING RECORDS.  
(Application filed Nov. 23, 1896.)  
Patented Mar. 21, 1899.
(No Model.)  
2 Sheets—Sheet 1.
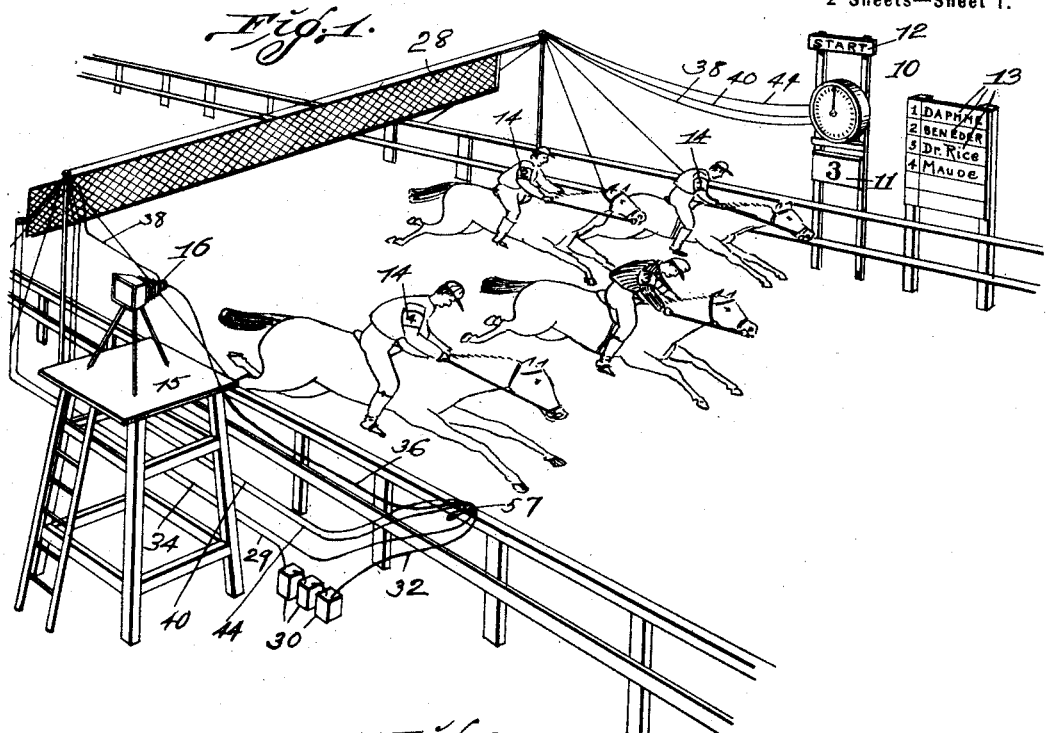
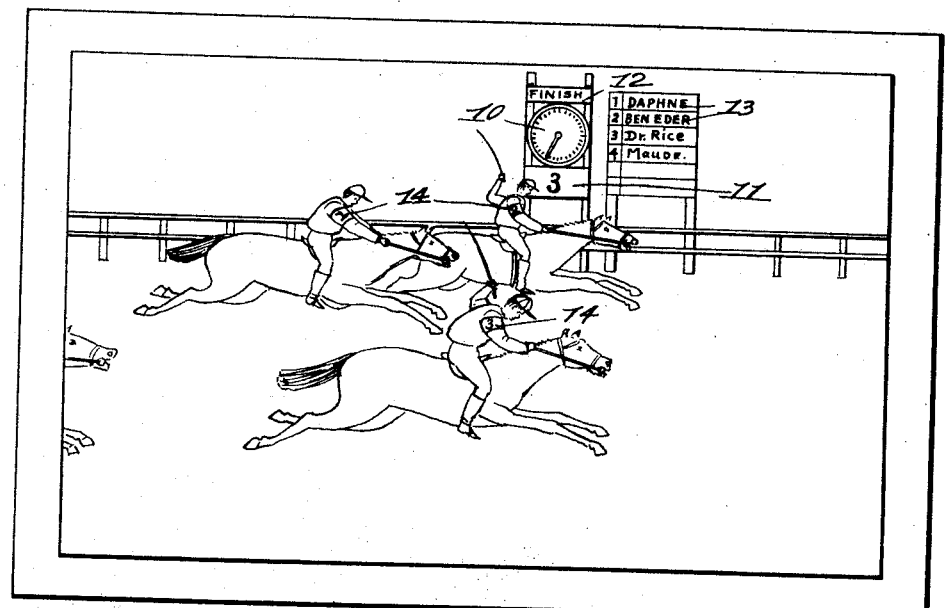

No. 621,314. Patented Mar. 21, 1899.
W. E. BARBER.
APPARATUS FOR MAKING RACING RECORDS.
(Application filed Nov. 23, 1896.)
(No Model.) 2 Sheets—Sheet 2.
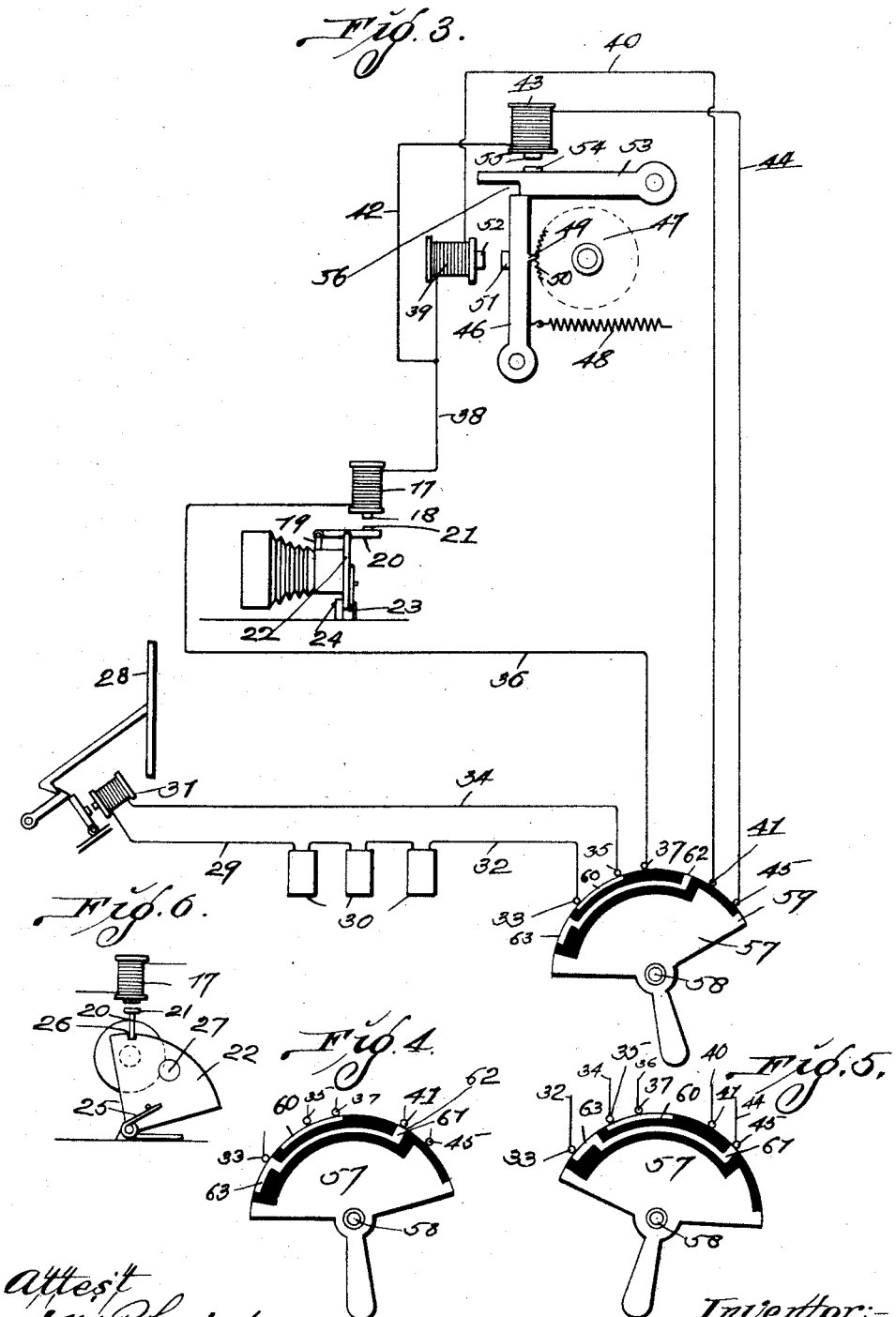
Attest
N. L. Smith
S. G. Wells
Inventor:—
W. E. Barber:—
By Higdon Longan & Higdon
attys.

UNITED STATES PATENT OFFICE.

WILLIAM EPHRAIM BARBER, OF HAMBURG, ILLINOIS.

APPARATUS FOR MAKING RACING-RECORDS.

SPECIFICATION forming part of Letters Patent No. 621,314, dated March 21, 1899.

Application filed November 23, 1896. Serial No. 613,131. (No model.)

*To all whom it may concern:*

Be it known that I, WILLIAM EPHRAIM BARBER, of the city of Hamburg, Calhoun county, State of Illinois, have invented certain new and useful Improvements in Apparatus for Making Racing-Records, of which the following is a full, clear, and exact description, reference being had to the accompanying drawings, forming a part thereof.

My invention relates to photographic racing-records; and it consists in the novel construction, combination, and arrangement of parts hereinafter shown, described, and claimed.

Figure 1 is a view in perspective of a race-track arranged for carrying out the principles of my invention. Fig. 2 is a view illustrating the photograph produced in accordance with the principles of my invention. Fig. 3 is a diagrammatic view illustrating the electric circuits used in carrying out the principles of my invention. Figs. 4 and 5 are views showing the different positions of the switch shown in Fig. 3. Fig. 6 is a front view of a camera and showing the means of electrically operating the same.

In carrying out the principles of my invention I mount a clock 10 at one side of the track, and in a plane above the racers and near the clock I display a number 11, indicating the number of the race, and words 12, such as "Start," "Finish," "First quarter," "Second quarter," &c., indicating the part of the race that is being photographed. I also display in a position near the clock a list 13, giving the numbers of the jockeys and the name of the horse ridden by each jockey and opposite the number of the jockey. In a conspicuous position upon the clothing of the jockeys I display numbers 14, corresponding to the numbers upon the list 13. Upon the opposite side of the track from the clock and a suitable distance from the track I erect a stand 15, and upon the stand I mount a photographic camera 16 in position to photograph the racers, the clock 10, the number 11, the word 12, and the list 13, thus producing a photograph substantially like that shown in Fig. 2.

While I have illustrated my invention with special reference to running a horse-race, it is obvious that it may be adapted to bicycle-races, foot-races, trotting-races, and all kinds of races without departing from the spirit of my invention.

The camera 16 is arranged to make an instantaneous photograph and is operated by an electric current. The coil-magnet 17 is placed above the camera, with the free end 18 of its cores pointing downwardly. An arm 19 extends upwardly from the camera, and a lever 20 is pivotally attached to the upper end of said arm. An armature 21 is carried by the free end of the lever 20 and in position to be operated by the cores 18. The slide 22 is in the form of a quadrant, and it is pivotally mounted between the posts 23 by means of the shaft 24, extending through said posts and through said quadrant. A spring 25 encircles the shaft 24, and its free end engages or is attached to the quadrant. A notch 26 is formed in the segmental edge of the quadrant and is engaged by the lever 20. When the magnet 17 is energized, the armature 21 is attracted, operating the lever 20 and disengaging it from the notch 26, and thus allowing the quadrant 22 to be operated by the spring 25. The opening 27 through the quadrant 22 passes the opening in the camera as the quadrant is operated by the spring 25, and an instantaneous exposure is made through said opening 27. The starting-gate 28 and the clock 10 may be operated by the same circuit that operates the camera.

The conductor 29 connects the batteries 30 with one pole of the magnet 31, which magnet operates the mechanism for releasing the starting-gate. The wire 32 connects the batteries 30 with the contact-point 33, and a wire 34 connects the contact-point 35 with the magnet 31. The wire 36 connects the contact-point 37 with the magnet 17. The wire 38 connects the magnet 17 with the magnet 39, which magnet operates to start the clock. The wire 40 connects the magnet 39 with the contact-point 41. The wire 42 is attached to the wire 38 and forms a connection between the magnet 17 and the magnet 43, which magnet operates to stop the clock. The wire 44 connects the magnet 43 with the contact-point 45. The lever 46 is pivotally mounted in position to engage the wheel 47 of the clock, and the retractile coil-spring 48 is attached to the said lever and to the frame of the clock in such a way that it will normally hold the free end of the lever 46 in engagement with said wheel 47, as required to hold the clock from running. A pawl 49 may be formed upon the face of the lever 46 and in position to engage the teeth 50 of the wheel 47. The armature 51 is carried by the lever 46 and in position to be operated by the cores 52 of the magnet 39. When the magnet 39 is energized to operate the armature 51, the pawl 49 is drawn away from the teeth 50 and the clock is allowed to start. A lever 53 is pivotally mounted in position at approximately right angles to the lever 46 and with its free end engaging the free end of said lever 46. An armature 54 is carried by the free end of the lever 53 and in position to be operated by the cores 55 of the magnet 43. In the lower face of the free end of the lever 53 is formed a notch 56, in position to receive the free end of the lever 46 when said lever is operated by the armature 31.

When the magnet 39 operates to start the clock, the free end of the lever 46 engages in the notch 56 in the free end of the lever 53, and the pawl 49 is thus held out of engagement with the clock and the clock is allowed to run until the magnet 43 is energized to operate the lever 53. When the free end of the lever 53 is drawn to the magnet 43, the coil-spring 48 draws the pawl 49 into contact with the clock-wheel 47, and thus stops the clock. The contact-points 33, 35, 37, 41, and 45 are arranged in an arc of a circle, and the switch 57 is pivotally mounted upon the pin 58 in such a position that its segmental periphery 59 is in engagement with all of said contact-points. The segmental face 59 is composed of hard rubber, and a conductor-plate 60 is embedded in said face. The outer face of the conductor-plate 60 is in position to engage the contact-points.

A conductor 61 has one of its ends 62 exposed upon one side of the plate 60 and some distance from said plate, and its opposite end 63 is exposed upon the opposite side of said plate 60. The ends 62 and 63 are electrically connected through the rubber and are not electrically connected to the plate 60, and said exposed ends are in position to engage the contact-points.

When the switch is in the position shown in Fig. 3, the contact-points 33 and 35 are electrically connected by means of the plate 60 and the circuit operating the magnet 31 to release the starting-gate 28 is closed and the gate will be released. After the racers pass under the starting-gate and are in line with the clock and the camera the switch is operated to the position shown in Fig. 4. The contact-points 35 and 37 are now connected by the plate 60, and the contact-points 33 and 41 are connected to the conductor 61. This brings the magnets 17 and 39 into the circuit and operates the camera and starts the clock at the same instant. This will produce a photograph showing the starters and the positions in which they start, showing the numbers upon the jockeys and the list 13, showing the horse which each jockey mounted, showing the number 11, indicating the number of the race, and the word 12, indicating that the photograph was made at the start of the race. At the finish of the race the switch 57 is operated to a position shown in Fig. 5. The contact-points 35 and 37 are connected by the plate 60, and the contact-points 33 and 45 are connected by the conductor 61. This brings the magnets 17 and 43 into circuit and produces a photograph, such as that illustrated in Fig. 2, which shows the relative positions in which the horses finished, the numbers of the jockeys mounting the respective horses, the number of the race, the list showing the names of the horses mounted by the respective jockeys, and the word "finish." The magnet 17 operates the camera to make the exposure, and the magnet 43 operates to stop the clock.

Thus it will be seen that by carrying out the principles of my invention a complete photographic record of a race may be made.

I claim—

In an apparatus for making race-records, a starting-gate, mechanism for releasing the same, an electromagnet for operating said mechanism, a photographic camera, an electromagnet for releasing the shutter thereof, a timepiece, mechanism for starting said timepiece, an electromagnet for operating said mechanism, means for stopping said timepiece, an electromagnet for operating said means, a segmental switch, a suitable conductor leading from the switch through the starting-gate magnet and back to said switch, a second conductor leading from the switch through the shutter-magnet, through the magnet that operates the means for stopping the timepiece and back to the switch, a third conductor attached to the second conductor at a point between the camera-magnet and the last-mentioned magnet and leading through the magnet which controls the mechanism of the timepiece and back to the switch, said switch being so constructed as to release the starting-gate at one movement, simultaneously operating the camera-shutter and starting mechanism of the timepiece at a second operation, and then simultaneously operating the camera-shutter and stopping mechanism of the timepiece at a third operation, substantially as specified.

In testimony whereof I affix my signature in presence of two witnesses.

WILLIAM EPHRAIM BARBER.

Witnesses:
S. G. WELLS,
MAUD GRIFFIN.